(No Model.) 2 Sheets—Sheet 1.

G. RIESECK.
MASH MACHINE AND GRAIN REMOVER.

No. 415,796. Patented Nov. 26, 1889.

WITNESSES:

INVENTOR
George Rieseck
By O. D. Levis
Attorney (No Model.) 2 Sheets—Sheet 2.
G. RIESECK.
MASH MACHINE AND GRAIN REMOVER.
No. 415,796. Patented Nov. 26, 1889.
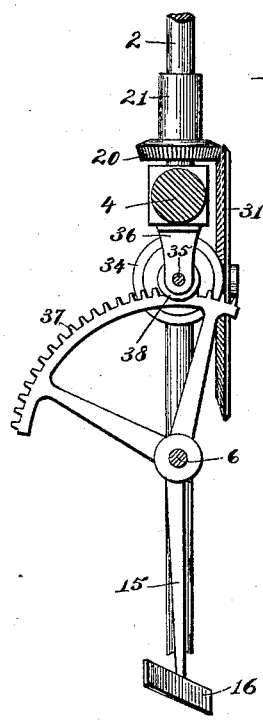
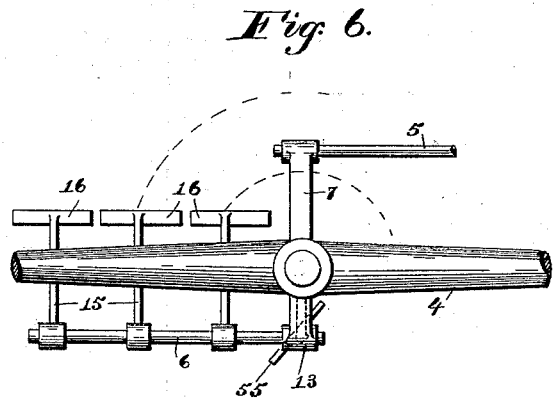
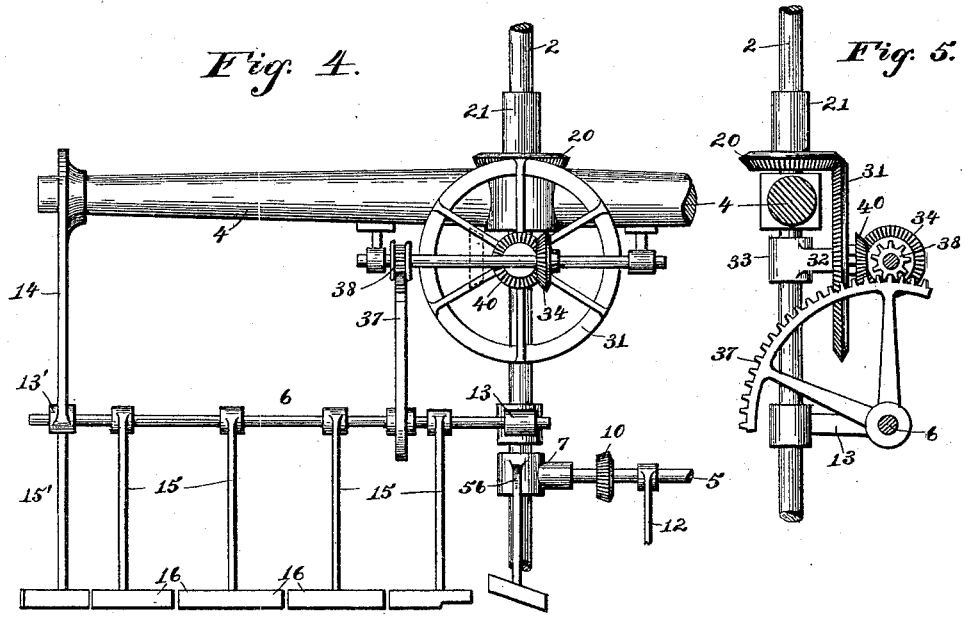
WITNESSES:
INVENTOR
George Rieseck
By C. D. Levis
Attorney

UNITED STATES PATENT OFFICE.

GEORGE RIESECK, OF ALLEGHENY, PENNSYLVANIA.

MASH-MACHINE AND GRAIN-REMOVER.

SPECIFICATION forming part of Letters Patent No. 415,796, dated November 26, 1889.

Application filed March 6, 1889. Serial No. 302,153. (No model.)

*To all whom it may concern:*

Be it known that I, GEORGE RIESECK, a citizen of the United States, residing at Allegheny, in the county of Allegheny and State of Pennsylvania, have invented certain new and useful Improvements in Mash-Machines and Grain-Removers; and I do hereby declare the following to be a full, clear, and exact description of the invention, such as will enable others skilled in the art to which it pertains to make and use the same, reference being had to the accompanying drawings, which form a part of this specification.

My present invention relates to mash-machines and grain-removers for preparing mash for brewing beer, &c.; and it has for its object to improve the mechanism for removing the grain from the mash-tub in an expeditious manner, without requiring an attendant to enter the mash-tub, and which can be operated directly from the main power-shaft or controlled by hand from the outside of the tub.

With these objects in view my invention consists in the combination, with a power-shaft carrying a horizontal beam, of a grain-removing shaft suspended from said beam and having a series of arms or paddles, a counter-shaft also carried by said beam and geared to the grain-removing shaft, and mechanism for rotating said counter-shaft either manually or by power from the main driving-shaft. This mechanism consists of a master-gear loosely journaled on a stud or short shaft on the vertical driving-shaft and geared to the horizontal counter-shaft, a pinion loosely fitted on the vertical driving-shaft and geared with the master-gear; and a horizontal shaft geared to the loose pinion for rotating the latter independently of the main driving-shaft, said horizontal shaft extending beyond the mash-tub and having means whereby it may be locked in position, or operated manually, or thrown into gear with the vertical driving-shaft, in order to automatically and continuously rotate the grain-removing shaft.

My invention further consists of the construction, combination, and arrangement of parts, as will be hereinafter fully described and claimed.

To enable others to understand my invention, I will now proceed to a detailed description thereof in connection with the accompanying drawings, in which—

Figure 1:
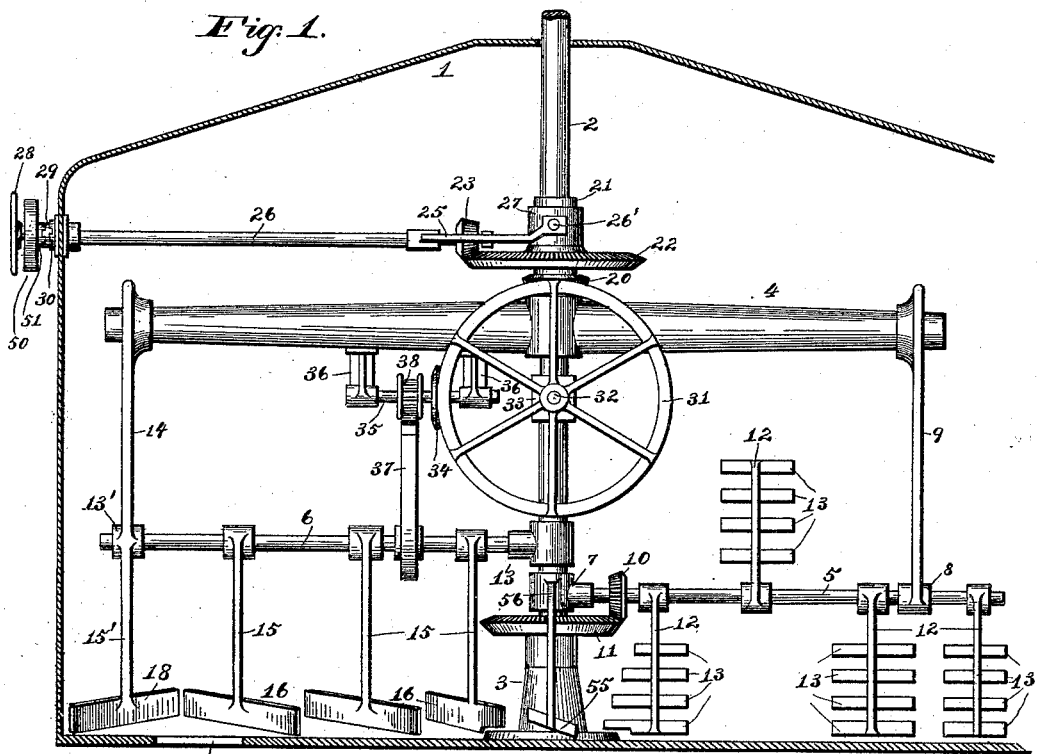
Figure 2:
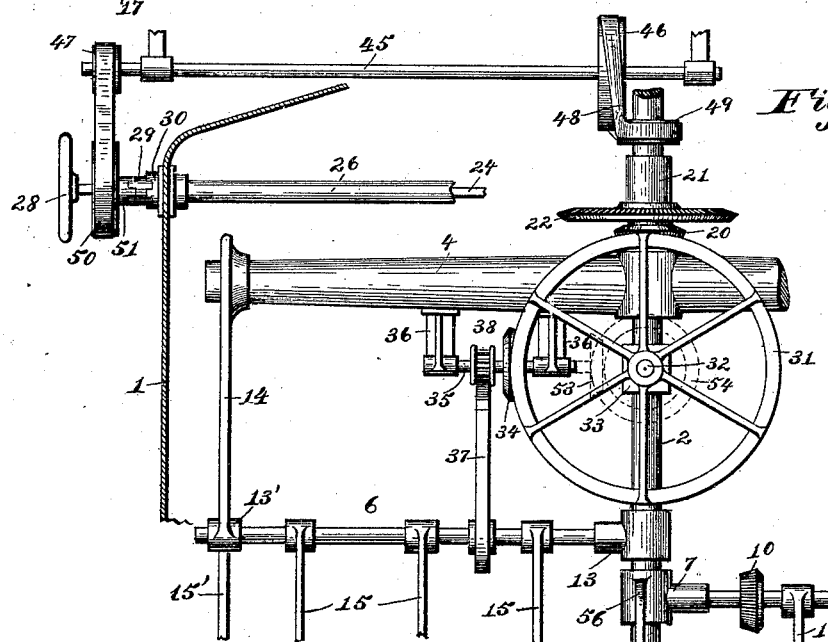

Figure 1 is an elevation with the mash-tub in section. Fig. 2 is an enlarged detail view of the feed mechanism for the grain-removing shaft in order to more clearly illustrate the same. Fig. 3 is an end view of the parts shown in Fig. 2. Figs. 4 and 5 are side and end elevations, respectively, of a modified form of my invention. Fig. 6 is a diagrammatic view illustrating a further modification in the arrangement of the grain-removing and mash shafts.

Like numerals of reference denote corresponding parts in all the figures of the drawings.

Within an ordinary mash-tub 1, I erect a vertical driving-shaft 2, which is journaled or stepped at its lower end in a fixed central bearing 3, and is extended at its upper end through the mash-tub to adapt suitable gearing to be connected thereto for rotating said shaft axially, in the manner well understood by those skilled in the art. A horizontal beam 4 is secured rigidly and centrally to this vertical driving-shaft, so as to turn or rotate therewith in the mash-tub, and this beam carries a mash-shaft 5 and a grain-removing shaft 6, which are suspended in horizontal positions therefrom and arranged on opposite sides of the vertical driving-shaft.

The mash-shaft 5 is supported and operated in the ordinary manner by being journaled in two bearings, one of which 7 is fixed to the vertical driving-shaft 2, above the central bearing 3, and the other 8 is on the lower end of a vertical arm 9, that is secured to the horizontal beam near one end.

To the mash-shaft 5, near its inner end, is fixed a bevel-pinion 10, which meshes with a stationary gear 11, which is fixed to the upper end of the central fixed bearing 3; and it is obvious that the mash-shaft 5 is turned or rotated on its axis when the vertical driving-shaft and horizontal beam are driven, as the pinion 10 will be turned owing to its contact with the stationary gear 11.

The mash-shaft 5 is provided with a series of radial arms 12, which carry paddles 13, of any preferred form.

The grain-removing shaft 6 is supported in a similar manner to the mash-shaft by means of bearings 13 13', which are secured, respectively, to the vertical driving-shaft and to the lower end of a vertical arm or hanger 14, that depends from the horizontal beam; but this grain-removing shaft does not rotate or turn on its axis, but assumes a vertical position with its paddles lowered, as shown in Figs. 1 and 3, when the machine is used for mashing the grain; nor is it provided with mash-paddles similar to those on the mash-shaft. This grain-removing shaft carries radial arms 15 and 15', said arm 15' carrying an oblique paddle 18, while each of the arms 15 carries at its outer end a single sweep or paddle 16, which paddles 16 are arranged oblique with relation to the longitudinal axis of the shaft 6 and parallel with each other, as shown in Fig. 1. The paddle 18 of the arm 15' is arranged in a reversely-inclined position with relation to the paddles 16 of the arms 15. The grain-removing shaft may be arranged immediately below and in the same vertical plane as the horizontal beam and vertical driving-shaft, as indicated in Figs. 1, 2, and 3; but in the present case I prefer to arrange the grain-removing shaft at one side of the horizontal beam out of the vertical plane of the same. With this arrangement of the grain-removing shaft and the paddles the paddles are arranged in line with each other parallel with the axis of the grain-removing shaft 6 and oblique to a line or radius drawn through each individual paddle-arm and the vertical driving-shaft, whereby the paddles serve more efficiently to shove or force the grain toward a man-hole or opening 17, formed in the bottom of the mash-tub.

In order to remove the grain after it has been mashed and the wort drawn off in the manner well understood by those skilled in the art, I have provided mechanism for turning or rotating on its axis the grain-removing shaft to force the paddles thereof upon and through the stiff grain, this mechanism being adapted for manual operation outside of the mash-tub, or automatically by power derived either from the vertical driving-shaft or by the motion of the horizontal beam and said driving-shaft as they are rotated in the mash-tub, as will be more fully explained presently.

A loose pinion 20 is fitted loosely on the vertical driving-shaft 2 at a point above the horizontal beam, and this pinion has an extended tubular or sleeve-shaped hub 21, which projects above the upper horizontal face of the pinion. To this tubular extension of the loose pinion is keyed a bevel gear-wheel 22, with which meshes a bevel-pinion 23, that is fixed to the inner end of a horizontal shaft 24, which shaft is supported in a horizontal stationary frame 25 and a tubular extension or rod 26. The inner end of this horizontal stationary frame is pivotally connected by trunnions 26' to a collar 27, which is fitted loosely on the upper end of the tubular extension of the loose pinion, and this frame is held in a stationary position by means of the tubular extension or rod 26, which extends and is firmly secured to the mash-tub in any suitable manner. By employing the pivot-connection between the inner end of the horizontal frame and the loose collar on the vertical driving-shaft the latter is made to serve as the support for the inner end of said frame, and by reason of this peculiar connection of the frame and the tubular extension thereof the frame can be readily adjusted to overcome any inaccuracies in the fittings of the other parts of the machine, as well as readily and conveniently adapted to mash-tubs of varying dimensions. The outer end of the horizontal shaft 24 is extended beyond the mash-tub and provided with a hand-wheel 28, by means of which said shaft and the mechanism to which it is geared can be operated manually, and this shaft is further provided with a clutch-section 29, which is preferably keyed to the shaft and adapted to be thrown or moved on said shaft into or out of gear with a fixed clutch-section 30 on the mash-tub, in order to lock said shaft against rotation on its axis when its clutch-section engages with the fixed section, but when the two clutch-sections are disengaged the shaft can be readily rotated.

A master-gear 31 is arranged in an upright vertical position at one side of the vertical driving-shaft, so as to mesh with the loose pinion above the horizontal beam, and this master-gear is loosely journaled on a horizontal stud or short shaft 32, which is secured to a fixed bearing 33 on the vertical driving-shaft. This master-gear also meshes with a small bevel-pinion 34, fixed to a horizontal counter-shaft 35, which is arranged below and parallel with the horizontal beam, said horizontal counter-shaft being journaled in bearings 36, which are fixed on the beam. The counter-shaft is geared to the grain-removing shaft by means of a segment 37, which is fixed to said removing-shaft 6, and is adapted to mesh with a pinion 38, that is fixed to the counter-shaft at one side of the driving-pinion 34 thereon, whereby the counter-shaft is adapted to be rotated by the horizontal shaft 24 through the intermediate gearing, in order to rotate the removing-shaft 6 and feed the paddles thereon to and through the grain.

In the modification of my invention shown in Figs. 4 and 5 I employ an intermediate gear-wheel 40 between the master gear-wheel 31 and the driving-pinion 34 on the horizontal counter-shaft.

In the embodiment of my invention shown in Figs. 1 to 3, inclusive, the removing shaft 6 is arranged in the same vertical plane as the horizontal beam, and hence the master-gear 31 is adapted to mesh directly with the loose pinion and the driving-pinion on the horizontal counter-shaft as said master-gear is arranged laterally of both the horizontal beam and counter-shaft; but in the modified form of my invention shown in Figs. 4 and 5, in which the horizontal counter-shaft is arranged at one side of the beam and out of the vertical plane thereof, the master-gear is arranged between the beam and counter-shaft. I therefore employ the intermediate gear 40 to transmit the motion of the master-gear to the counter-shaft. This intermediate gear 40 is secured rigidly to the master-gear to rotate therewith and meshes with the driving-pinion on the counter-shaft.

By reference to Fig. 4 it will be noted that the counter-shaft extends at both ends beyond the master-gear, and is journaled in boxes on opposite sides of said gear, which enables me to place the drive-pinion 34 of the counter-shaft on either side of the intermediate gear at will, as indicated by full and dotted lines in Fig. 4, whereby the counter-shaft and removing shaft can be rotated in either direction, as is obvious. I have also provided mechanism for transmitting the motion of the vertical driving-shaft to the grain-removing shaft to rotate the latter at a greater or less speed than is attained when the loose pinion is locked against rotation and the master-gear rotated by traveling around and in contact with said pinion, in order to feed the paddles of the grain-removing shaft. My preferred embodiment of this mechanism is shown in Figs. 1 and 2, in which I employ a horizontal shaft 45, which is arranged above the shaft 24 for operating the loose pinion manually, and this shaft 45 is geared to the vertical driving-shaft and to said shaft 24. I prefer to employ belt-gearing between these several shafts, and to this end the ends of said shaft 45 are provided with pulleys 46 and 47, the inner one 46 of which is driven by a quarter-turn belt 48 from a pulley 49 on the upper end of the vertical driving-shaft, while the outer pulley 47 is belted to a pulley 50 on the outer end of the shaft 24. This pulley 50 is fitted loosely on the shaft 24 and provided with a clutch-section 51, which is adapted to be thrown into engagement with the clutch on the shaft 24, whereby said shaft 24 can be rotated through the intermediate shaft 45 from the main shaft or from any other line-shaft, and thus automatically operate the grain-removing shaft.

The counter-shaft may be rotated at a slower rate of speed, either automatically or by hand, by the gear-wheels 53 and 54, indicated by dotted lines in Fig. 2. In this arrangement the gear-wheel 54 is fixed to the inner face of the master-gear on the side thereof adjoining the counter-shaft, while the gear-wheel 53 is fixed to the end of the counter-shaft to gear with the wheel 54, the bevel-gear 34, which meshes with the master-gear, being omitted when this arrangement of gearing 53 54 is employed to secure a slower motion.

In order to prevent the grain from accumulating around the base of the central fixed bearing and the outer edges of the mash-tub, I have provided inclined paddles 18 and 55.

The paddle 18 and its supporting-arm 15' are located at the outer end of the grain-removing shaft, while the paddle 55 is carried by the lower end of a bent bracket-arm 56, which is fixed to and depends from the fixed bearing on the vertical driving-shaft for supporting the inner end of the grain-removing shaft. These paddles 18 and 55 are arranged in an inclined or oblique position to the line of the paddles on the removing-shaft, and they incline in opposite directions in order to sweep or shove the grain from the central standard and surrounding wall of the mash-tub into the path of the paddles on the removing-shaft, as will be readily understood.

The operation of my invention is as follows: After the malt has been mashed by the paddles of the mash-shaft and grain-removing shaft in the manner well known to the art and the wort has been drawn off, the arms and paddles of the grain-removing shaft are elevated or raised out of the mash, which can be easily and expeditiously effected by operating the shaft 24 manually, which rotates the loose pinion, the master-gear, and the counter-shaft, and thus turns the removing-shaft 6. To remove the grain with an automatic feed, either one of two methods can be practiced, my preferred way of doing which I will first describe. The sliding clutch-section on the operating-shaft 24 is disengaged from the pulley 50 and thrown into engagement with the fixed clutch-section on the mash-tub, which serves to lock the shaft 24 from rotation on its axis, and the shaft in turn locks the gear-wheel and loose pinion from movement. The vertical driving-shaft is now rotated slowly and carries with it the horizontal beam and the several mechanisms suspended therefrom, and as the master-gear meshes with the loose pinion, which, however, is locked in a fixed position by the shaft 24, it is obvious that the master-gear will be slowly rotated while the vertical driving-shaft and horizontal beam are in motion. This movement of the master-gear is transmitted to the horizontal shaft, which in turn operates the gear-segment, and thus rotates the grain-removing shaft on its axis, the effect of which is to force the paddles on said shaft upon and into the grain, and thereby force the upper part of the grain toward the outlet-opening. The other method of operating the feed mechanism is by power transmitted from the vertical driving-shaft or any other line-shaft to the grain-removing shaft through the intermediate shafts 24 45 and the several connecting-gearings. To thus operate the grain-removing shaft, the sliding clutch-section on the shaft 24 is disengaged from the fixed section on the mash-tub and thrown into engagement with the clutch-section on the pulley 50, thus freeing the shaft 24. The motion of the vertical driving-shaft is transmitted to the horizontal shaft 45 by the quarter-twisted belt, which in turn rotates the shaft 24 and the counter-shaft through the intermediate belt and bevel-gearing described, whereby the counter-shaft is caused to rotate the grain-removing shaft at a greater or less speed and by power derived from the vertical driving-shaft. The mash-shaft 5 and the grain-removing shaft 6 may also be arranged on opposite sides of a horizontal line drawn through the vertical power-shaft and parallel with the beam 4, as clearly shown in the diagram view in Fig. 6 of the drawings; and when said shafts are so arranged it is obvious that they lie in vertical planes outside of the plane of the beam 4 and shaft 2, whereby the paddles on the arms 12 15 on the shafts 5 6, respectively, are oblique to a line or radius drawn through the shaft 2 and each individual arm.

I would have it understood that I do not restrict myself to the exact details of construction and form and proportions of parts herein shown as an embodiment of my invention, as I am aware that changes and alterations therein can be made without departing from the spirit or sacrificing the advantages of my invention.

Having thus fully described my invention, what I claim as new, and desire to secure by Letters Patent, is—

1. The combination, with a vertical driving-shaft, a beam, and an axially-turning grain-removing shaft, of a loose pinion fitted on said driving-shaft, a horizontal counter-shaft geared with said loose pinion, and mechanism, substantially as described, for rotating the loose pinion, as and for the purpose set forth.

2. The combination, with a vertical driving-shaft, a beam, and an axially-turning grain-removing shaft, of a horizontal counter-shaft journaled on the beam, a loose pinion fitted on the driving-shaft, a master-gear intermediate of the loose pinion and counter-shaft, and a shaft geared with said loose pinion, substantially as and for the purpose described.

3. The combination, with a vertical driving-shaft, a beam, and an axially-turning grain-removing shaft, of a counter-shaft journaled on the beam, a loose pinion fitted on the driving-shaft and geared to the counter-shaft, and a shaft geared to the loose pinion and having a locking device for holding itself and the loose pinion against axial movement, substantially as and for the purpose described.

4. The combination, with a vertical driving-shaft, a beam, and an axially-turning grain-removing shaft, of a horizontal counter-shaft journaled on the beam, a loose pinion fitted on the driving-shaft, a vertical master-gear loosely journaled on the driving-shaft and geared to the loose pinion and counter-shaft, a horizontal operating-shaft geared to the loose pinion, and a locking device for holding said horizontal shaft and loose pinion against axial movement, arranged and combined substantially as and for the purpose described.

5. The combination, with a vertical driving-shaft, a beam, and an axially-turning grain-removing shaft, of a loose pinion fitted on the driving-shaft, an operating horizontal shaft geared to said loose pinion, another horizontal shaft geared to the vertical driving-shaft and the horizontal operating-shaft, and a counter-shaft geared to the loose pinion and the grain-removing shaft, all arranged and combined for service, substantially as and for the purpose described.

6. The combination, with a vertical driving-shaft, a beam, and an axially-turning grain-removing shaft, of a loose pinion fitted on the vertical driving-shaft, a horizontal shaft 24, geared to said pinion, another horizontal shaft 45, geared to the vertical driving-shaft to be driven thereby, gearing and clutch mechanism intermediate of the two horizontal shafts 24 45, for the purpose described, and a counter-shaft journaled on the beam and geared to the loose pinion and the grain-removing shaft, substantially as described, for the purpose specified.

7. The combination of a vertical driving-shaft, a horizontal beam carried by said shaft, a horizontal axially-turning shaft 6, suspended from said beam parallel with the same and arranged on one side of the vertical plane thereof, and a series of arms fixed to said shaft 6 and having paddles which are arranged obliquely with relation to the shaft 6 or parallel with each other and oblique to to a line or radius drawn through the vertical driving-shaft and the individual mash-arms, substantially as and for the purpose specified.

8. The combination of a vertical driving-shaft, a beam carried by the shaft, a grain-removing shaft arranged on one side of the vertical plane of the beam parallel with the same, and a series of arms fixed to the removing-shaft and having paddles which are arranged obliquely to a line or radius drawn through the vertical driving-shaft and the individual mash-arms, substantially as and for the purpose specified.

In testimony that I claim the foregoing I hereunto affix my signature this 4th day of March, A. D. 1889.

GEORGE RIESECK. [L. S.]

In presence of—
M. E. HARRISON,
O. D. LEVIS.